(12) United States Patent
Stronkowsky et al.

(10) Patent No.: US 9,995,888 B2
(45) Date of Patent: Jun. 12, 2018

(54) OPTICAL FIBER TERMINATION TOOL

(71) Applicant: The Siemon Company, Watertown, CT (US)

(72) Inventors: Kevin John Stronkowsky, Middlebury, CT (US); David A. Medeiros, Watertown, CT (US); Scott Robert Nagel, Trumbull, CT (US); John E. Gogol, Jr., Wolcott, CT (US); Anthony Veatch, Morris, CT (US)

(73) Assignee: THE SIEMON COMPANY, Watertown, CT (US)

( * ) Notice: Subject to any disclaimer, the term of this patent is extended or adjusted under 35 U.S.C. 154(b) by 0 days. days.

(21) Appl. No.: 15/655,360

(22) Filed: Jul. 20, 2017

(65) Prior Publication Data
US 2018/0024293 A1 Jan. 25, 2018

Related U.S. Application Data

(60) Provisional application No. 62/364,910, filed on Jul. 21, 2016.

(51) Int. Cl.
*G02B 6/38* (2006.01)
*G02B 6/255* (2006.01)

(52) U.S. Cl.
CPC ......... *G02B 6/3898* (2013.01); *G02B 6/3833* (2013.01); *G02B 6/2553* (2013.01); *G02B 6/2556* (2013.01); *G02B 6/2557* (2013.01); *G02B 6/2558* (2013.01)

(58) Field of Classification Search
CPC ............................ G02B 6/3898; G02B 6/3833
See application file for complete search history.

(56) References Cited

U.S. PATENT DOCUMENTS

| | | |
|---|---|---|
| 6,931,193 B2 | 8/2005 | Barnes |
| 7,258,496 B2 | 8/2007 | Saito et al. |
| 7,280,733 B2 | 10/2007 | Larson et al. |
| 7,346,255 B2 | 3/2008 | Yamaguchi et al. |
| 7,346,256 B2 | 3/2008 | Marrs et al. |
| 7,412,145 B2 | 8/2008 | Honma et al. |
| 7,572,064 B2 | 8/2009 | Dejong |
| 8,401,356 B2 | 3/2013 | Nishioka et al. |
| 8,442,375 B2 | 5/2013 | Bylander et al. |
| 9,075,204 B2 | 7/2015 | Nishioka |
| 2010/0316344 A1 | 12/2010 | Bylander et al. |

(Continued)

FOREIGN PATENT DOCUMENTS

| | | |
|---|---|---|
| JP | 200658399 A | 3/2006 |
| JP | 2006113152 A | 4/2006 |
| KR | 100846740 B1 | 7/2008 |

OTHER PUBLICATIONS

International Search Report and Written Opinion for application PCT/US17/42503, dated Oct. 18, 2017, 13 pages.

(Continued)

*Primary Examiner* — Jerry Rahll
(74) *Attorney, Agent, or Firm* — Cantor Colburn LLP

(57) ABSTRACT

An optical fiber termination tool includes a tool base having a pocket to receive a mechanical splice optical fiber connector; a lever hingedly connected to the tool base, the lever including a wedge; and a slide mounted to the lever, the slide slidable relative to the lever, the slide movable from a first position to a second position to move the wedge from a disengaged position to an engaged position.

10 Claims, 12 Drawing Sheets

(56) References Cited

U.S. PATENT DOCUMENTS

2013/0114932 A1  5/2013  Horibe et al.

OTHER PUBLICATIONS

Siemon, "Lightbow Fiber Optic Termination System", Light House Advanced Fiber Cabling Solutions, Product Catalog; publication, Aug. 29, 2016, available at: http://files.siemon.com/int-download-brochures/brc_lightbow.pdf>, 9 pages.

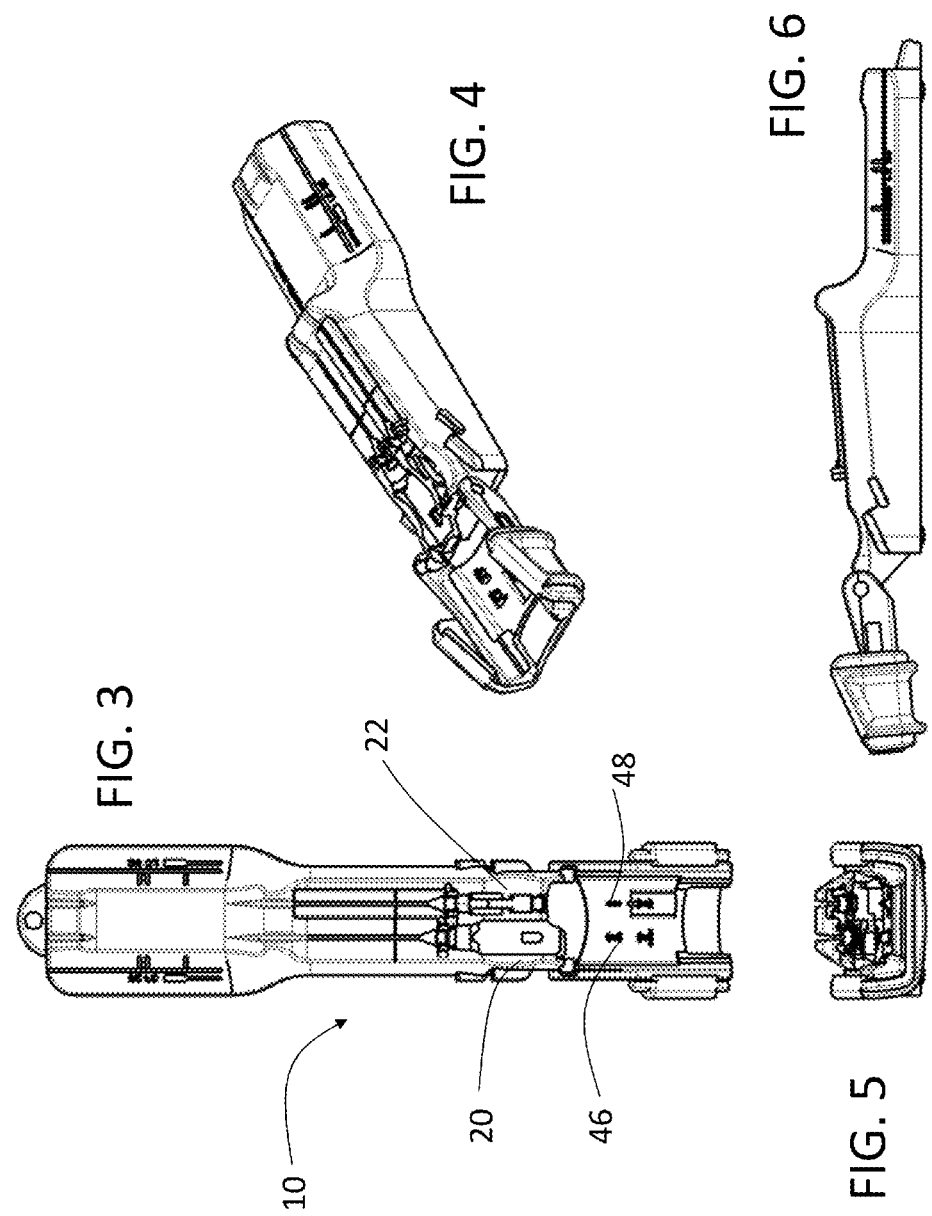

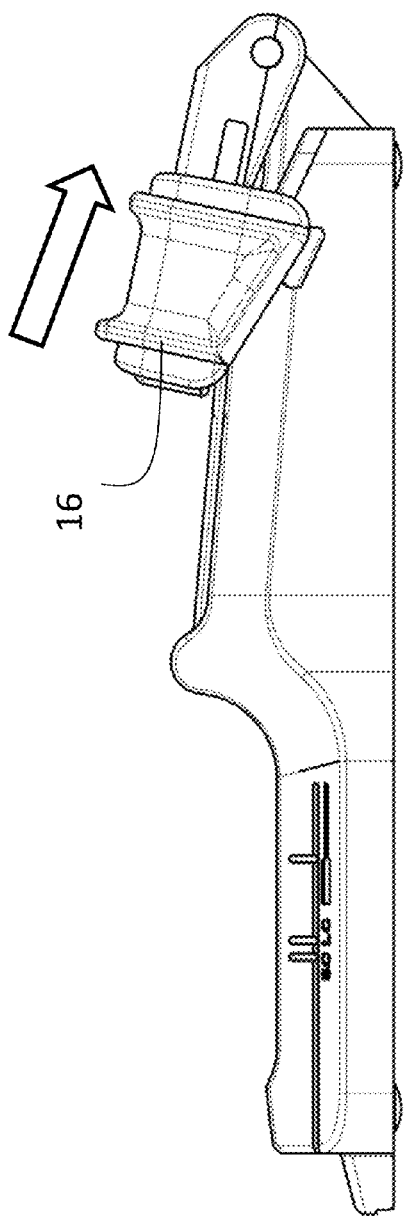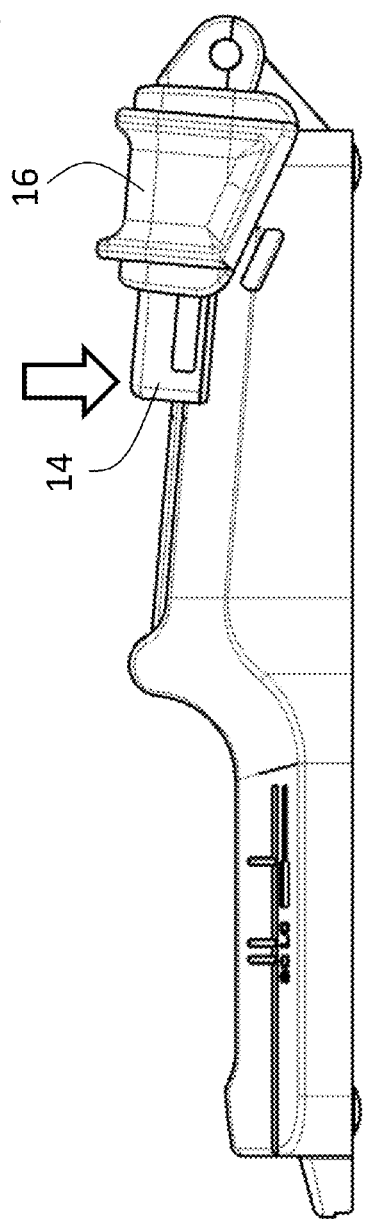

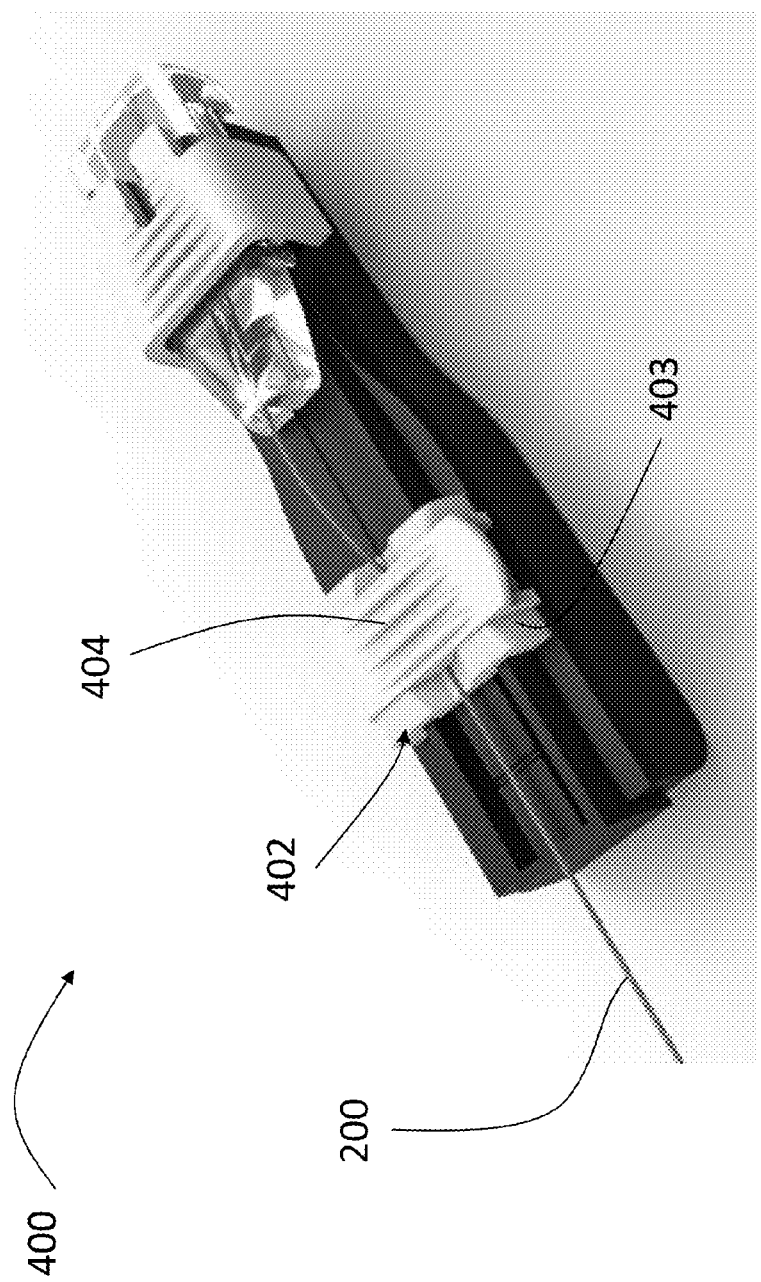

OPTICAL FIBER TERMINATION TOOL

CROSS-REFERENCE TO RELATED APPLICATIONS

This application claims the benefit of U.S. provisional patent application Ser. No. 62/364,910, filed Jul. 21, 2016, the entire contents of which are incorporated herein by reference.

TECHNICAL FIELD

The subject matter disclosed herein relates generally to termination tools for optical fiber, and more particularly, to an optical fiber termination tool for use with a mechanical splice connector.

BACKGROUND

An optical fiber is often attached or terminated to a connector. One type of connector used in the field is known as a mechanical splice connector. The mechanical splice connector typically includes a v-groove with a fiber stub positioned at one end. To terminate an optical fiber to the connector, the v-groove is opened, the optical fiber positioned in the v-groove abutting the fiber stub and the v-groove closed. A tool to facilitate terminating an optical fiber to a mechanical splice connector would be well received in the art.

BRIEF DESCRIPTION OF THE DRAWINGS

Referring now to the drawings wherein like elements are numbered alike in the FIGURES:

FIG. 3 is a top view of an optical fiber termination tool in an embodiment;

FIG. 4 is a perspective view of an optical fiber termination tool in an embodiment;

FIG. 5 is an end view of an optical fiber termination tool in an embodiment;

FIG. 6 is a side view of an optical fiber termination tool in an embodiment;

FIGS. 9-15 depict a process to terminating an optical fiber to a mechanical splice connector in an embodiment;

FIG. 17 is a perspective view of an optical fiber termination tool in an embodiment.

DETAILED DESCRIPTION

Figure 1:
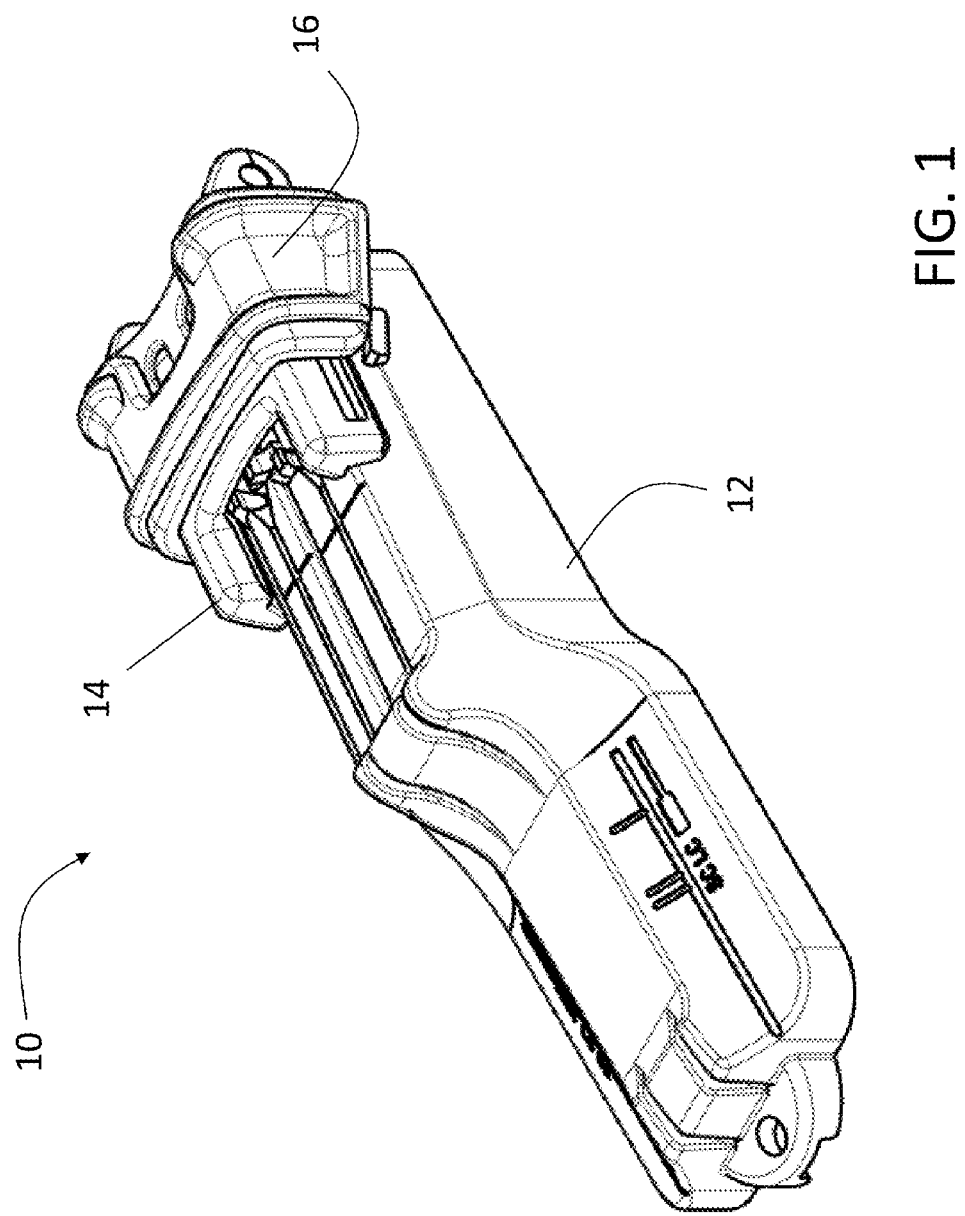
FIG. 1 is a perspective view of an optical fiber termination tool in an embodiment.

FIG. 1 is a perspective view of an optical fiber termination tool 10 in an embodiment. The optical fiber termination tool 10 includes a tool base 12, a lever 14 and a slide 16. The optical fiber termination tool 10 is used with optical fiber connectors having a v-groove. As known in the art, the v-groove is preloaded with a polished fiber stub in one end. To terminate an optical fiber in the v-groove, with v-groove is opened and the optical fiber slid into contact with the fiber stub. The v-groove is then closed. The optical fiber termination tool 10 facilitates these operations.

Figure 2:
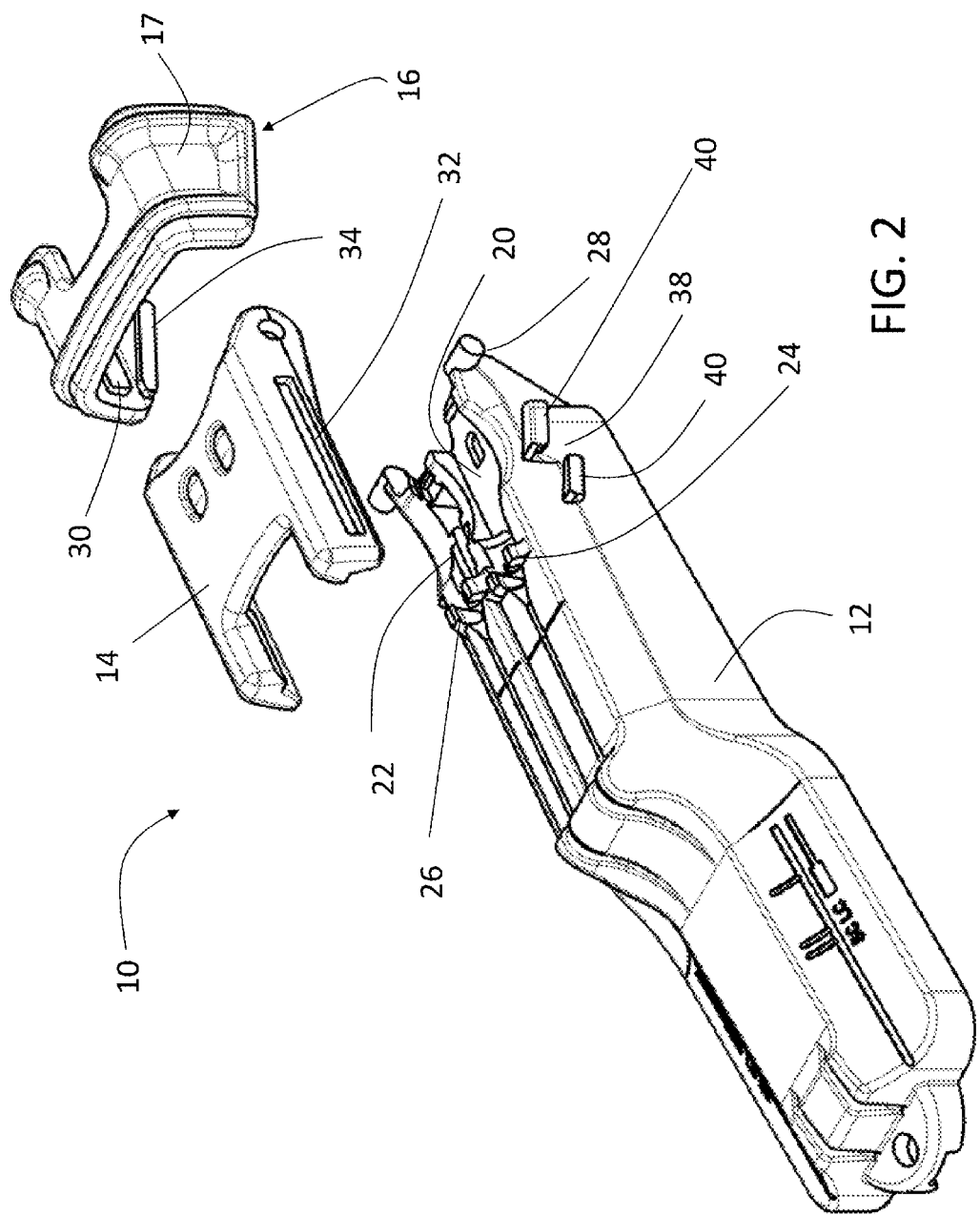
FIG. 2 is an exploded, perspective view of an optical fiber termination tool in an embodiment.

FIG. 2 is an exploded, perspective view of the optical fiber termination tool 10 in an embodiment. As shown in FIG. 2, the tool base 12 includes two pockets 20 and 22 located at a front portion of the tool base 12. The pockets 20 and 22 receive mechanical splice optical fiber connectors. Adjacent to each pocket 20/22 is a stop 24/26 which prevents movement of the mechanical splice optical fiber connector once in pocket 20/22. The pockets 20/22 may be contoured and sized to fit different types of connectors. In one embodiment, pocket 20 accommodates an SC type connector and pocket 22 accommodates an LC type connector. It is understood that tool 10 may be used with other types of connectors.

Pockets 20 and 22 may be formed in a removable cradle, such that an installer may use a cradle having the appropriate pocket with the tool base 12. A cradle may also include multiple pockets (i.e., a reversible cradle) contoured and sized for use with different types of connectors. To cradle would be oriented (e.g., rotated) so that the correct pocket is accessible in the tool base 12.

Lever 14 is hingedly secured to tool base 12 through hinge pines 28. Slide 16 includes a top and two side walls 17. The inside surface of each side wall 17 includes a rib 30 and a finger 34. Slide 16 slidably engages lever 14 through the ribs 30 that are received in grooves 32 on the lever 14. The ribs 30 travel in grooves 32 and limit travel of the slide 17 relative to the lever 14. Fingers 34 pass through notches 38 formed on edge side of the tool base 12. Notches 38 may be defined by protrusions 40. Fingers 34 are positioned at an angle relative to ribs 30. As the ribs 30 move through grooves 32, the slope of fingers 34 traveling through notch 38 causes the slide 16 and lever 14 to move downwards, towards the tool base 12. As described in further detail herein, this action opens the v-groove in the mechanical splice optical fiber connector.

FIG. 3 is a top view of the optical fiber termination tool 10 in an embodiment. Evident in FIG. 3 are wedges 46 and 48 on the underside surface of lever 14. Two wedges 46 are provided for alignment with pocket 20 and two wedges 48 are provided for alignment with pocket 22. Wedges 46 may be configured to work with a certain type of connector. For example, if pocket 20 is contoured and sized to accept an SC type connector, then wedges 46 are sized and spaced to engage and open the v-groove in the SC connector. Similarly, if pocket 22 is contoured and sized to accept an LC type connector, then wedges 48 are sized and spaced to engage and open the v-groove in the LC connector. Although two wedges 46 and two wedges 48 are shown, there may be embodiments where only one wedge is needed to open the v-groove. Embodiments are not limited to using two wedges 46/48. FIG. 4 is a perspective view of the optical fiber termination tool 10 in an embodiment. FIG. 5 is an end view of the optical fiber termination tool 10 in an embodiment. FIG. 6 is a side view of the optical fiber termination tool 10 in an embodiment.

Figure 8:
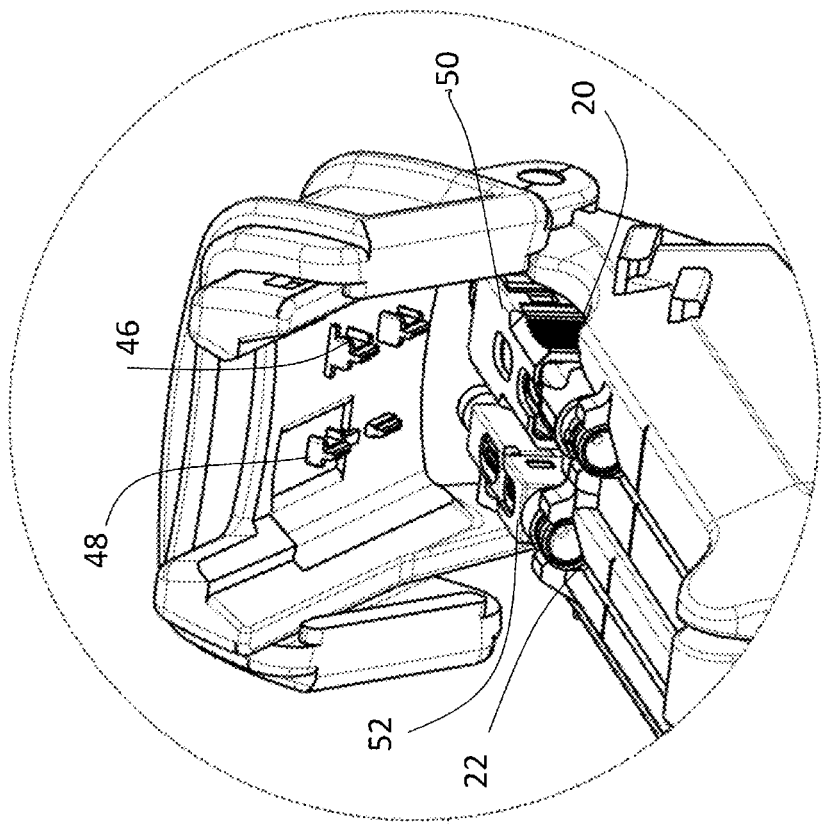
FIG. 8 is a exploded view of a portion of FIG. 7.
Figure 7:
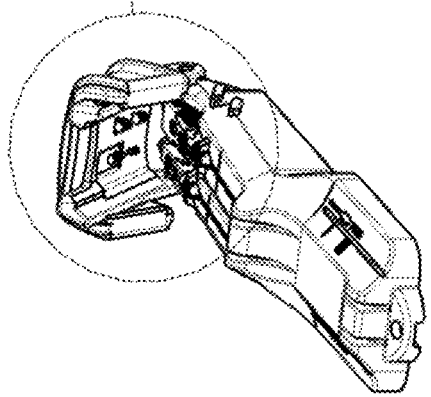
FIG. 7 is a perspective view of an optical fiber termination tool in an embodiment.

FIG. 7 is a perspective view of the optical fiber termination tool 10 with lever 14 partially closed. FIG. 8 is an exploded view of a portion of FIG. 7. An SC connector 50 is positioned in pocket 20 and an LC connector 52 is positioned in pocket 22. Evident in FIG. 8 is the alignment of wedges 46 and 48 with the SC connector 50 positioned in pocket 20 and the LC connector 52 positioned in pocket 22. Wedges 46 and wedges 48 have different shapes to work with the different connector types.

Figure 9:
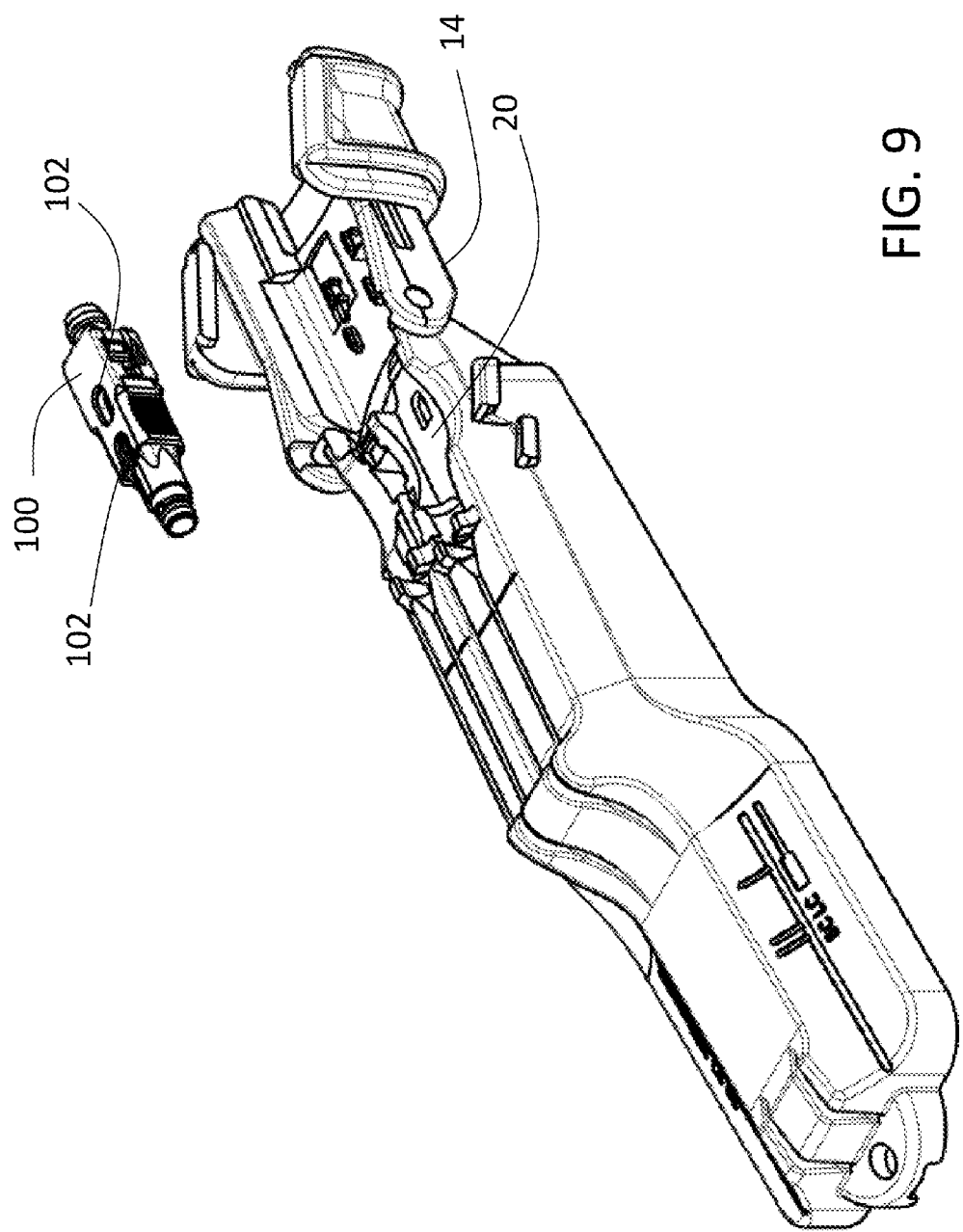

FIGS. 9-15 depict a process of terminating an optical fiber to a mechanical splice connector 100 in an embodiment. As shown in FIG. 9, the lever 14 is placed in an open positioned so that an SC connector 100 is loaded into pocket 20. Windows 102 on the connector 100 provide access to the v-groove inside connector 100. Windows 102 face upwards, towards the lever 14.

Figure 10:
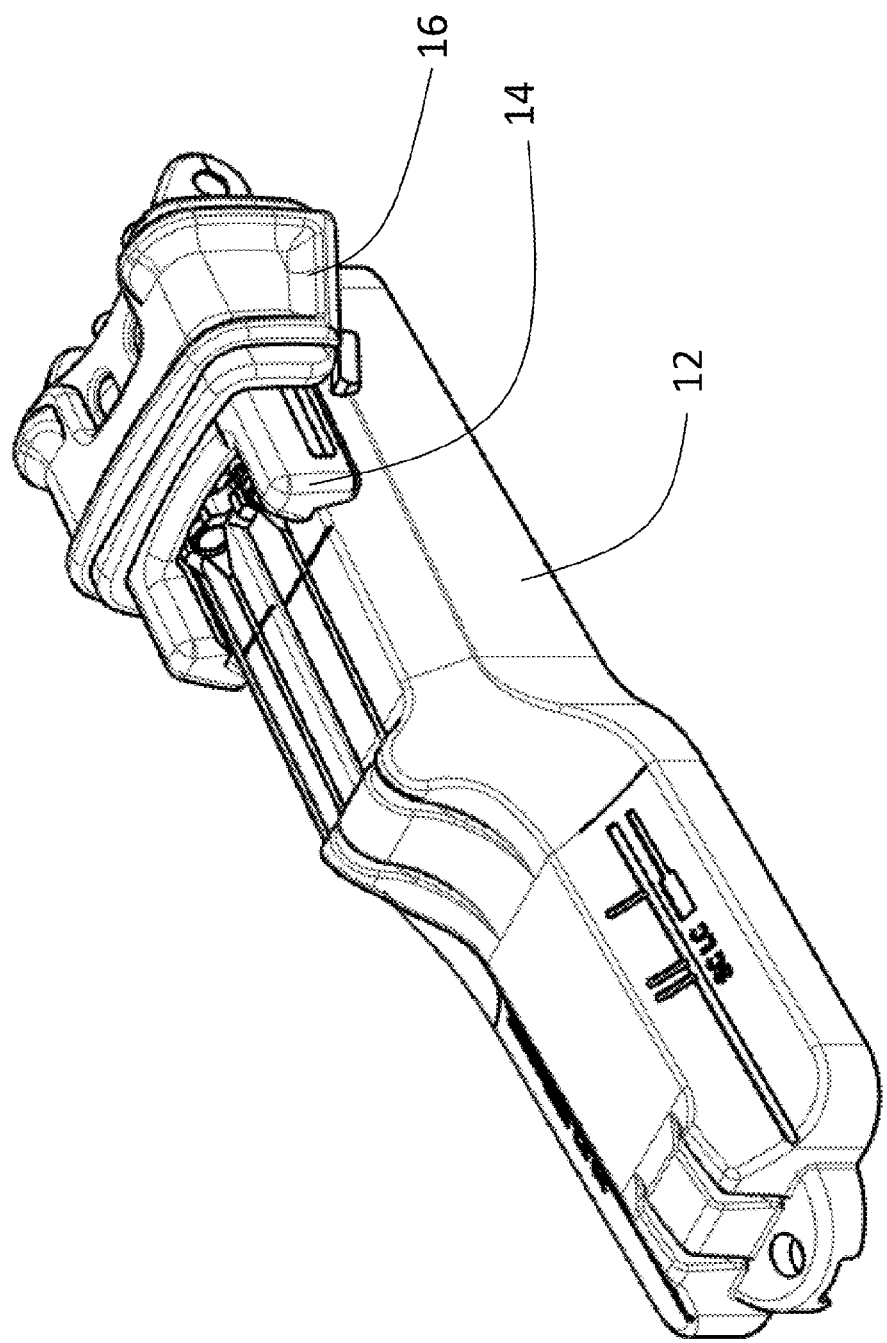

Referring to FIG. 10, lever 14 is closed to hold the connector 100 in place in pocket 20. The slide 16 is then moved from a first position to a second position. FIG. 11 shows the slide 16 in the first position and FIG. 12 shows the slide 16 in the second position. The interaction between fingers 34 and notches 38 pulls the lever 14 downwards such that wedges 46 engage the v-groove in connector 100 and open the v-groove when the slide 16 is in the second position. When the slide 16 is in the first position as shown in FIG. 11, the wedges 46 are in a disengaged position, meaning the wedges 46 are not opening the v-groove in connector 100.

Figure 13:
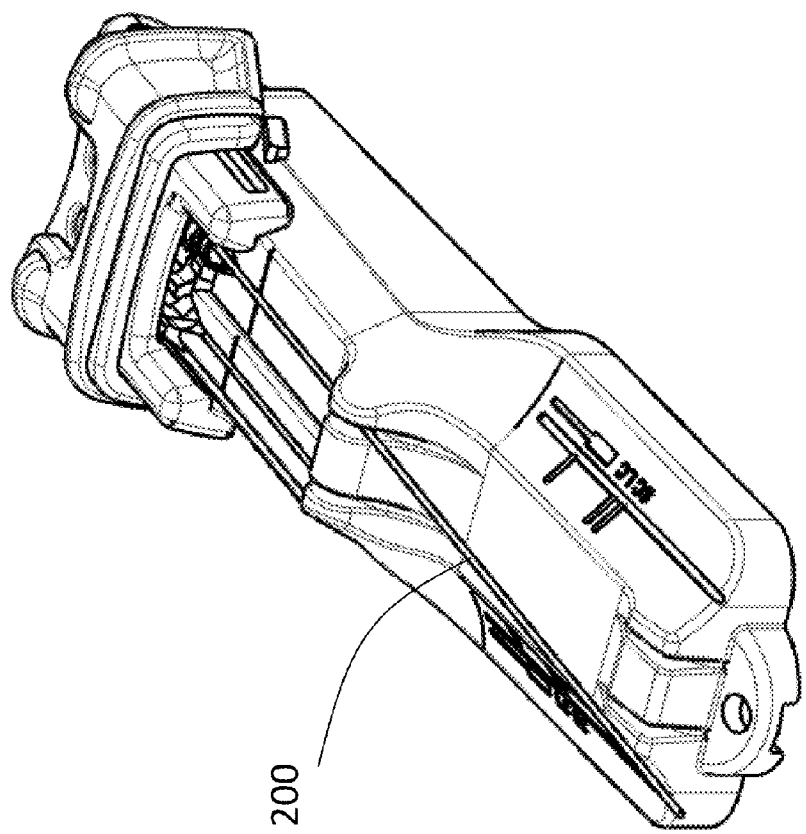
Figure 14:
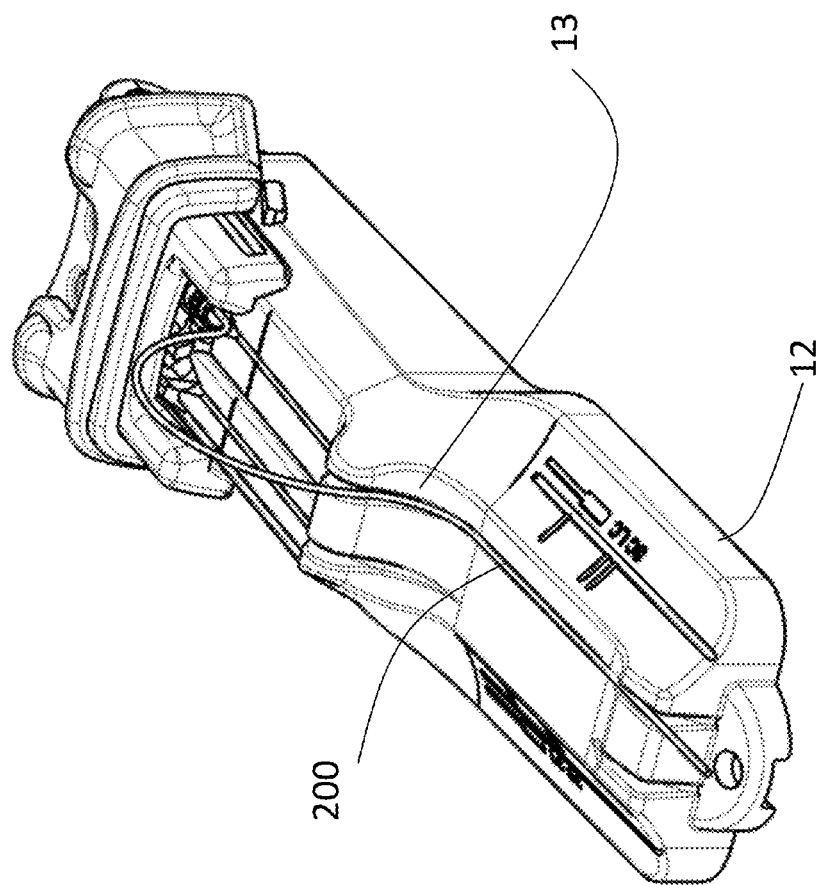
Figure 15:
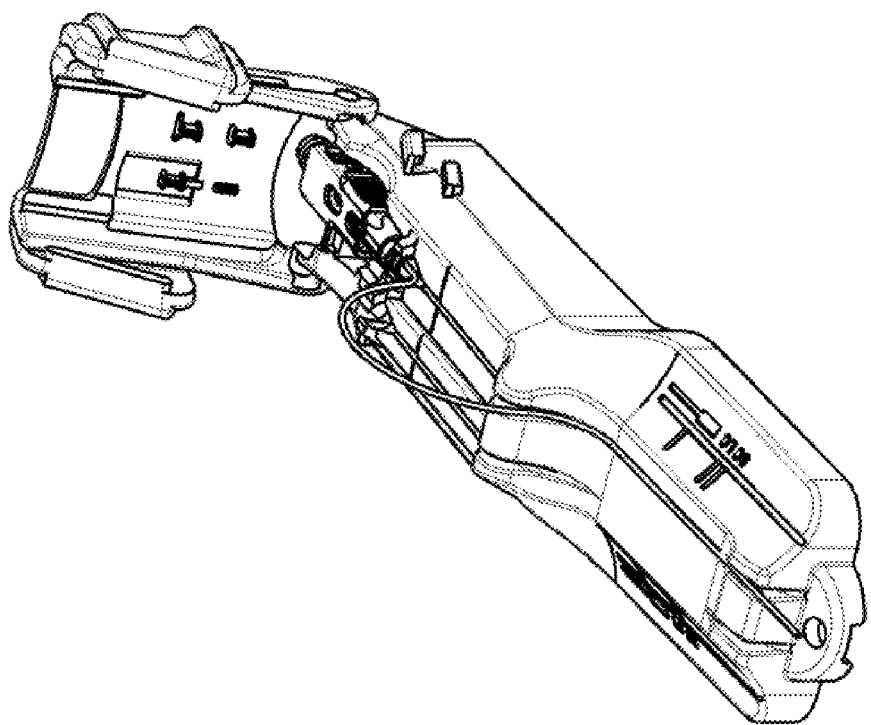

As shown in FIG. 13, an optical fiber 200 is then slid into the v-groove of the connector 100. The optical fiber 200 may refer to a jacketed, fiber optical cable that has been prepared for termination with the connector 100. The optical fiber 200 is inserted in the v-groove until it butts against the fiber stub located in the connector 100. As shown in FIG. 14, a bow may be formed in the optical fiber 200 to ensure that the optical fiber 200 is pressing against the fiber stub in the connector 100. A ramp 13 may be provided on tool base 12 to facilitate forming the bow in the optical fiber 200. Once the optical fiber 200 is properly positioned, the slide 16 is moved from the second position (FIG. 12) to the first position (FIG. 11) and the lever 14 opened as shown in FIG. 15. This removes wedges 48 from the v-groove in connector 100 which secures the optical fiber 200 to the connector 100.

Figure 16:
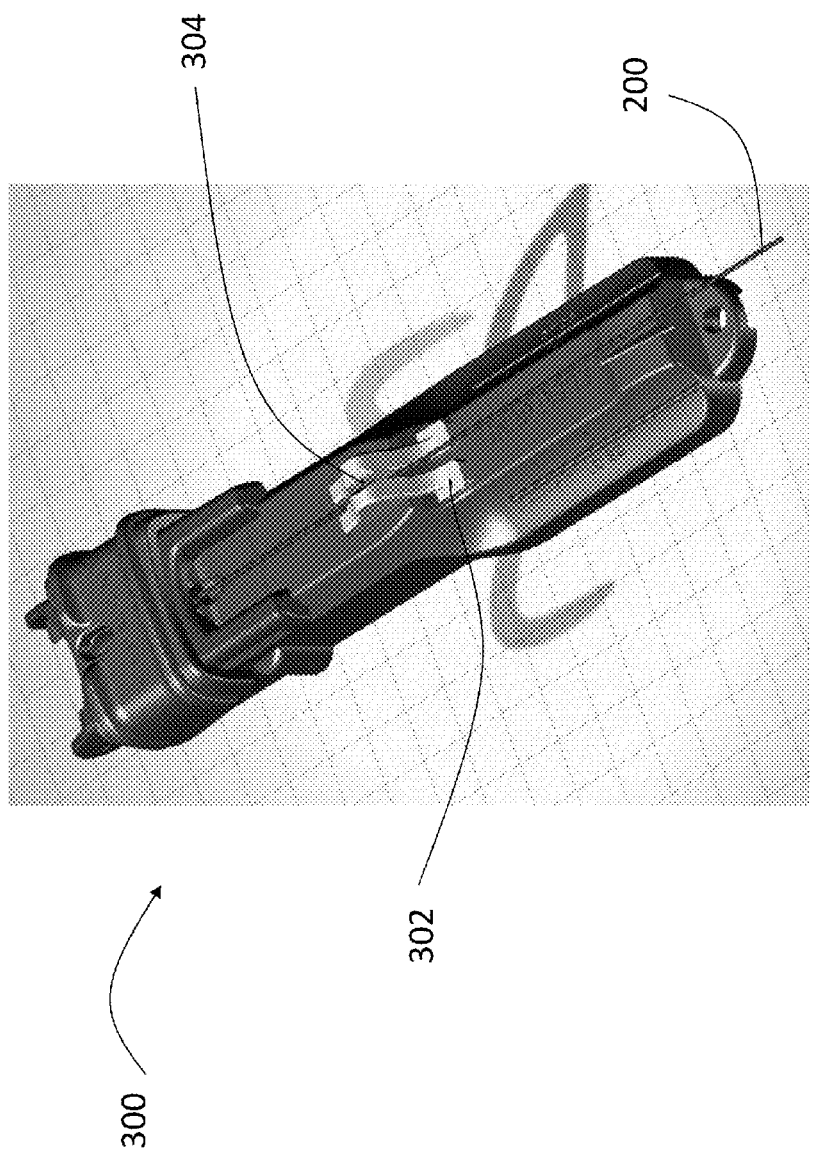
FIG. 16 is a perspective view of an optical fiber termination tool in an embodiment.

FIG. 16 depicts a tool 300 in another embodiment. Tool 300 is similar to tool 10, but includes a slidable fiber clamp 302 to aid in forming the bow in the optical fiber 200 shown in FIG. 14. This fiber clamp 302 is intended to hold the optical fiber and help create the bow. The optical fiber 200 is laid into a slot 304 in the fiber clamp 302, then the fiber clamp 302 is moved with a thumb or finger. This closes the walls of slot 304 on the optical fiber 200 and advances the optical fiber 200 forward to a stopping position to create the bow the optical fiber 200.

FIG. 17 depicts a tool 400 in another embodiment. Tool 400 includes a slidable fiber clamp 402 to aid in forming the bow in the optical fiber 200 shown in FIG. 14. This fiber clamp 402 is intended to hold the optical fiber and help create the bow. The optical fiber 200 is laid into a base 403 in the fiber clamp 402, then a cover 404 is closed to secure the optical fiber 200. The fiber clamp 402 may then be moved with a thumb or finger to advance the optical fiber 200 forward to a stopping position to create the bow the optical fiber 200.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description.

What is claimed is:

1. An optical fiber termination tool comprising:
   a tool base having a pocket to receive a mechanical splice optical fiber connector;
   a lever hingedly connected to the tool base, the lever including a wedge; and
   a slide mounted to the lever, the slide slidable relative to the lever, the slide movable from a first position to a second position to move the wedge from a disengaged position to an engaged position.

2. The optical fiber termination tool of claim 1 further comprising:
   a pocket located in the base, the pocket configured to receive a mechanical splice optical fiber connector.

3. The optical fiber termination tool of claim 2 wherein:
   the pocket is formed in a cradle configured for removable mounting to the base.

4. The optical fiber termination tool of claim 2 further comprising:
   a stop formed on the base, the stop sized and positioned to prevent movement of the mechanical splice optical fiber connector in pocket.

5. The optical fiber termination tool of claim 2 wherein:
   the slide includes a top and two side walls.

6. The optical fiber termination tool of claim 5 wherein:
   an inside surface of each side wall includes a rib;
   the lever includes grooves;
   the ribs being positioned in the grooves to limit travel of the slide relative to the lever.

7. The optical fiber termination tool of claim 5 wherein:
   an inside surface of each side wall includes a sloped finger;
   the base includes notches;
   wherein travel of the fingers through the notches moves the wedge towards the pocket.

8. The optical fiber termination tool of claim 2 further comprising:
   a slidable fiber clamp on the base, the slidable fiber clamp slidable relative to the base to aid in forming a bow in an optical fiber mated with the mechanical splice optical fiber connector.

9. The optical fiber termination tool of claim 8 wherein:
   the slidable fiber clamp includes a cover, the configured to be closable about the optical fiber.

10. A method for terminating an optical fiber to a mechanical splice optical fiber connector using an optical fiber termination tool comprising a tool base having a pocket to receive the mechanical splice optical fiber connector, a lever hingedly connected to the tool base, the lever including a wedge and a slide mounted to the lever, the slide slidable relative to the lever, the slide movable from a first position to a second position to move the wedge from a disengaged position to an engaged position, the method comprising:
   moving the lever to an open position;
   placing the mechanical splice optical fiber connector in the pocket;
   moving the lever to a closed position;
   moving the slide from the first position to the second position;
   inserting an optical fiber into the mechanical splice optical fiber connector;
   moving the slide from the second position to the first position; and
   moving the lever to the open position.

* * * * *